United States Patent [19]
Owen

[11] Patent Number: 6,041,881
[45] Date of Patent: Mar. 28, 2000

[54] TRACTOR TRANSMISSION CASING

[75] Inventor: Sion Morgan Owen, Lutterworth, United Kingdom

[73] Assignee: Agco Limited, Coventry, United Kingdom

[21] Appl. No.: 08/991,325

[22] Filed: Dec. 16, 1997

[30] Foreign Application Priority Data

Dec. 20, 1996 [GB] United Kingdom .................... 9626561

[51] Int. Cl.[7] .................................................. F16H 57/02
[52] U.S. Cl. ........................... 180/346; 74/606 R; 74/607
[58] Field of Search .................................. 180/346, 344, 180/377; 74/606 R, 607; 403/45, 47; 256/13.1

[56] References Cited

U.S. PATENT DOCUMENTS 4,023,439  5/1977  Herr .
4,030,706  6/1977  Ward .
4,167,982  9/1979  Ishioka et al. .
4,387,605  6/1983  Grey et al. .
5,335,965  8/1994  Sessini .

Primary Examiner—Eric Culbreth
Attorney, Agent, or Firm—MacMillan, Sobanski & Todd, LLC

[57] ABSTRACT

A transmission casing for a tractor, eg on agricultural tractor, having a three point linkage for lifting implements, incorporates reinforcing bars (22) running the length of the casing to the top and on each side. Turnbuckles (26) allow the bars (22) to be placed in tension, thereby placing in compression the upper parts of the castings (1, 2, 3) making up the body of the transmission casing. In this way, the load bearing capacity of the casing the and thus of the tractor may be increased.

12 Claims, 1 Drawing Sheet

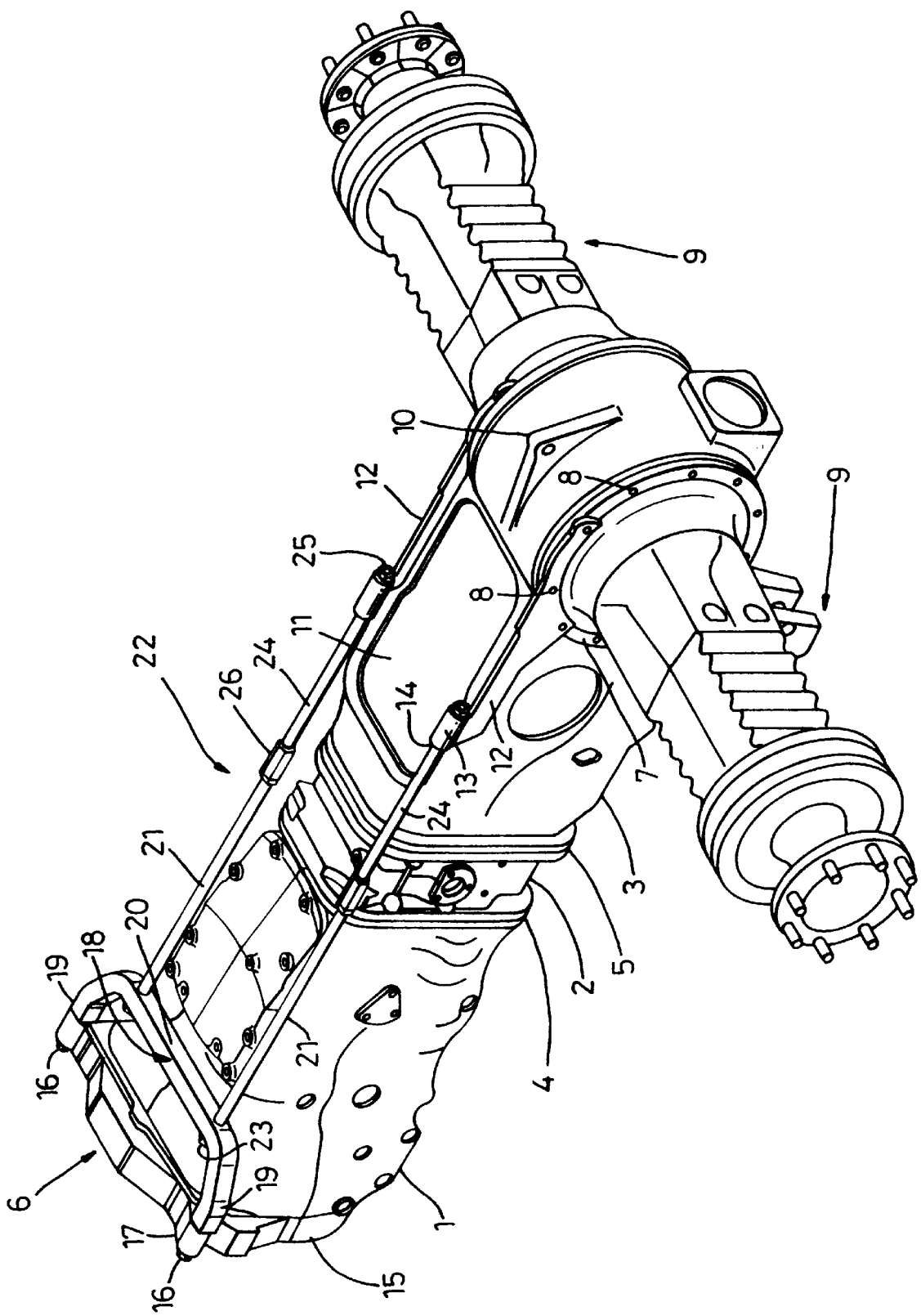

TRACTOR TRANSMISSION CASING

BACKGROUND OF THE INVENTION

The present invention relates to transmission casings for tractors, particularly agricultural tractors equipped with a three point linkage for lifting agricultural implements.

Conventionally, tractors are built around a transmission casing which effectively forms the chassis of the tractor with all other components mounted on it. Tractors are often required to support large loads at the front or rear, for example on the three point linkage of an agricultural tractor, or in the bucket of a tractor loader. This loading, either in front of the front wheels or behind the rear wheels, will be such as to place the upper half of the transmission casing in tension and the lower half in compression. This sort of loading can cause cracks in the upper parts of the transmission casing, and this is the primary factor in determining the maximum safe load which an agricultural tractor can bear on its three point linkage.

SUMMARY OF THE INVENTION

An object of the present invention is to provide a cost effective, simple and reliable way of increasing the load bearing capacity of a tractor transmission casing.

BRIEF DESCRIPTION OF THE DRAWING

The FIGURE is a perspective view of a tractor transmission casing in accordance with the invention, together with rear transaxle.

DETAILED DESCRIPTION

Referring to the Figure, a transmission casing comprises three cast sections 1, 2 and 3 bolted together through mating integral cast flanges, shown at 4 and 5 in the figure. The front of the casing is shown at 6; in a complete tractor the engine would be fitted here. At the rear of the casing, in each side of the rearmost cast section 3 is a large circular aperture 7 around whose periphery is a series of bolt holes 8 by means of which the two rear transaxle halves 9 are secured to the casing.

The particular embodiment described here is a transmission casing for an agricultural tractor. A cast "lift cover" would normally be fitted over the large square aperture 11 in the top of the rearmost section 3 to house hydraulic lifting apparatus to which the three point linkage would be connected.

Secured by bolts to some of the bolt holes 8 for mounting the transaxle halves 9 are a pair of rear mounting brackets 12, of machined plate steel. The brackets 12 extend forwards on each side of the rearmost cast section 3 and are each formed with an upwardly directed projection 13 at the forward end. In each projection 13 is a horizontal bore 14, whose axis lies parallel to the length of the transmission casing, to one side of it, and slightly above its upper surface or at least the lower parts of its upper surface.

At the forward end 6 of the transmission casing a plate steel interface member 15 is bolted to the end face of the foremost casting 1. The interface member 15, in a complete tractor, provides means for securing the engine to the transmission.

Integral lugs 17 extend upwardly and outwardly from the two top corners of the interface member 15. Passing through bores in these lugs 17 are bolts 16 securing a machined steel forward mounting bracket 18. The bracket 18 is of generally "U" shape lying in a horizontal plane extending rearwardly of the interface member, with the ends of its leg portions 19 abutting the lugs 17 of the interface member 15 and secured to it by means of the bolts 16.

The rearmost portion of the bracket 18 is formed as a substantially straight portion 20 extending transversely with respect to the length of the transmission casing, to slightly beyond each side of the casing.

Passing through a horizontal bore on each side of the straight portion 20 of the bracket 18 is a forward section 21 of a reinforcing bar 22. The forward end of each bar section 21 is formed with an external thread and a nut 23 fitted onto the threaded portion on the inner side of the bracket 18, to retain the bar.

A rear section 24 of each reinforcing bar 22 passes through the bore 14 in the respective rear mounting bracket 12. An external thread is formed at the rear end of each bar section 24 and a nut 25 fitted to retain the bar in its respective rear bracket 12.

The forward 21 and rear 24 bar sections are slightly too short to abut one another. The adjacent ends (i.e. the rearmost end of the forward section 21 and the forward end of the rear section 24) are formed with opposite handed external threads.

Turnbuckle devices 26 are provided in the form of a hollow sleeve with its nut surface formed with a hexagonal section for engagement by a spanner and the inner surface formed with internal opposite handed threads at each end. A turnbuckle 26 is fitted on the opposite handed threads at the adjacent ends of the forward and rear bar sections 21, 25 on each side of the transmission casing.

The apparatus described above is used to place the upper parts of the transmission casing castings 1, 2, 3 in compression. The turnbuckle 26 on each reinforcing bar 22 is rotated until a desired tension is achieved. The tension is set simply by setting the torque on the turnbuckle 26 and this has been found to provide sufficient accuracy. Alternatively, a low torque could be set, followed by rotation of the turnbuckle through a given angle. Another possibility would be to measure the bolt length extension.

With the upper parts of the castings 1, 2, 3 stressed in this way, a significant load can be placed behind the rear wheels (eg on the three point linkage) or in front of the front wheels of the complete tractor before any part of the transmission casing castings 1, 2, 3 are placed in tension. Thereafter, the load can be increased further until the normal acceptable limit of tensile load in the upper parts of the transmission casing castings is reached.

It will be noted that no alterations to the castings 1, 2, 3 are required to adapt an otherwise conventional transmission casing into a casing reinforced in the above described way. The rear mounting brackets are fitted onto the already existing holes 8 and the forward bracket is fitted onto the lugs 17 which requires only slight alternation of the interface member 18, already a machined component, to create the lugs 17. It will be appreciated that the incorporation of the reinforcing bars and brackets represents a much cheaper way of increasing the load capacity of a tractor than re-designing the castings and re-tooling for their production.

What is claimed is:

1. A transmission casing for a tractor comprising:

a main body defining a length; and a bar secured to a portion of said main body by brackets at first and second spaced apart positions thereon, said bar being under a tensile load so as to exert a tensile force on a portion of said casing, said bar and said brackets extending over substantially the entire length of said main body.

2. The transmission casing for a tractor defined in claim 1 wherein said bar includes means for adjusting said tensile load.

3. The transmission casing for a tractor defined in claim 2 wherein said bar has a thread formed thereon, and wherein said means for adjusting includes a turnbuckle meshing with said thread.

4. The transmission casing for a tractor defined in claim 3 wherein said bar includes first and second sections having opposite handed threads formed on adjacent ends thereof, and wherein said turnbuckle meshes with said opposite handed threads formed on said first and second sections of said bar.

5. The transmission casing for a tractor defined in claim 1 wherein said bar is a first bar and said brackets include a first bracket, and further including a second bar secured to a portion of said main body by brackets at first and second spaced apart positions thereon, said second bar being under a tensile load so as to exert a tensile force on a portion of said casing, said second bar and said brackets extending over substantially the entire length of said main body.

6. A transmission comprising:

a casing;

an input shaft extending within said casing;

an output shaft extending from said casing;

a plurality of gears supported within said casing and selectively connectable between said input shaft and said output shaft for providing a plurality of speed reduction gear ratios therebetween; and a bar secured to said casing at first and second spaced positions thereon, said bar being under tensile load so as to exert a tensile force on a portion of said casing.

7. The transmission defined in claim 6 wherein said bar includes means for adjusting said tensile load.

8. The transmission defined in claim 7 wherein said bar has a thread formed thereon, and wherein said means for adjusting includes a turnbuckle meshing with said thread.

9. The transmission defined in claim 8 wherein said bar includes first and second sections having opposite handed threads formed on adjacent ends thereof, and wherein said turnbuckle meshes with said opposite handed threads formed on said first and second sections of said bar.

10. The transmission defined in claim 6 wherein said bar is a first bar, and further including a second bar secured to said casing at first and second spaced positions thereon, said second bar being under tensile load so as to exert a tensile force on a portion of said casing.

11. The transmission defined in claim 6 wherein said bar is secured to a portion of said main body by brackets at first and second spaced apart positions thereon.

12. The transmission defined in claim 11 wherein said bar and said brackets extends over substantially the entire length of said main body.

* * * * *